(12) United States Patent
Kretschmer et al.

(10) Patent No.: US 8,463,477 B2
(45) Date of Patent: Jun. 11, 2013

(54) METHOD AND SYSTEM FOR CONTROLLING AN ELECTRICAL MACHINE IN A DRIVETRAIN OF A MOTOR VEHICLE

(75) Inventors: Markus Kretschmer, Murr (DE); Gunther Goetting, Stuttgart (DE); Mykhaylo Klymenko, Gerlingen (DE); Markus Peter, Zaberfeld (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/198,634

(22) Filed: Aug. 4, 2011

(65) Prior Publication Data
US 2012/0053770 A1 Mar. 1, 2012

(30) Foreign Application Priority Data

Aug. 24, 2010 (DE) .................. 10 2010 039 701

(51) Int. Cl.
*A47L 1/08* (2006.01)
(52) U.S. Cl.
USPC ............... 701/22; 701/36; 701/41; 700/29
(58) Field of Classification Search
USPC ............ 701/22; 180/65.265; 318/561, 609, 318/610, 400.23; 700/29, 32
See application file for complete search history.

(56) References Cited

U.S. PATENT DOCUMENTS

| 5,495,158 | A  | * | 2/1996 | Schmidt et al. | 318/561 |
| 6,037,736 | A  | * | 3/2000 | Tsuruta et al. | 318/609 |
| 7,395,124 | B2 | * | 7/2008 | Schmidt et al. | 700/29 |
| 7,684,879 | B2 | * | 3/2010 | Yutkowitz | 700/29 |
| 7,856,281 | B2 | * | 12/2010 | Thiele et al. | 700/32 |
| 2005/0034538 | A1 | * | 2/2005 | Rehm et al. | 73/862.08 |
| 2005/0116677 | A1 | * | 6/2005 | Tsuruta et al. | 318/610 |
| 2010/0019709 | A1 | * | 1/2010 | Le Neindre et al. | 318/400.23 |

FOREIGN PATENT DOCUMENTS

DE 10 2004 039 756 2/2006
DE 10 2005 015 484 5/2006

* cited by examiner

*Primary Examiner* — Thomas Black
*Assistant Examiner* — Robert Payne
(74) *Attorney, Agent, or Firm* — Kenyon & Kenyon LLP

(57) ABSTRACT

A method and a system are described for controlling an electrical machine in a drivetrain of a motor vehicle, the electrical machine being used as a drive unit for the motor vehicle. A pilot control unit determines a pilot control torque as a function of a predefined target torque of the electrical machine, the pilot control unit having a transfer function that corresponds to an oscillation component of a transfer function, ascertained in model-supported fashion for the overall drivetrain, that describes a dependence of a rotation speed of the electrical machine on a torque with which the electrical machine is operated. A control unit for the electrical machine determines a corrected target torque for the electrical machine by superimposing the pilot control torque on the predefined target torque and controlling the electrical machine as a function of the corrected target torque.

9 Claims, 4 Drawing Sheets

US 8,463,477 B2

METHOD AND SYSTEM FOR CONTROLLING AN ELECTRICAL MACHINE IN A DRIVETRAIN OF A MOTOR VEHICLE

RELATED APPLICATION INFORMATION

The present application claims priority to and the benefit of German patent application no. 10 2010 039 701.6, which was filed in Germany on Aug. 24, 2010, the disclosure of which is incorporated herein by reference.

FIELD OF THE INVENTION

The present invention relates to a method and a system for controlling an electrical machine in a drivetrain of a motor vehicle.

BACKGROUND INFORMATION

Electrical machines are being used more and more frequently as drive units in drivetrains of motor vehicles (electric vehicles, hybrid vehicles). A basic property of the drivetrain of a motor vehicle is its ability to oscillate. This means that especially in a context of dynamic load changes, the rotation speed of the electrical machine can oscillate considerably despite an ideally smooth profile for the propulsion torque of the electrical machine. FIG. 1 shows, by way of example, a profile over time of a torque $T_{ELM}$ of an electrical machine, and below it the rotation speed $n_{ELM}$ of the electrical machine resulting therefrom. The oscillations that occur after the load change at t=1 s are clearly evident here. Such oscillations occur independently of the specific configuration of the drivetrain, and are observable both with "conventional" drivetrains and with drivetrains in which an electrical machine is coupled to a differential gearbox of a driven axle ("electric axle") or directly to a wheel hub ("wheel hub drive system"). The oscillations that are introduced result, however, not only in impaired comfort but in an avoidable mechanical stress on the drivetrain.

DE 10 2005 015 484 A1 discloses a method for controlling a drivetrain of a vehicle having an internal combustion engine, at least one electrical machine, a fully automatic transmission, and at least one control device for controlling the internal combustion engine and the at least one electrical machine, in which method a load-change shock is avoided by pilot-controlling the at least one electrical machine.

DE 10 2004 039 756 A1 discloses a method for operating a drive system that encompasses an input drive device, an output drive device, and a connecting device connecting the output drive device with the input drive device. In this, a current oscillation state of the drive system is determined, and on the basis of this oscillation state at least one correction variable is generated and is applied at least indirectly to the drive system for oscillation damping. In order to determine the current oscillation state of the drive system, corresponding state variables at least of the input drive device, output drive device, and connecting device are ascertained.

SUMMARY OF THE INVENTION

The present invention makes available a method for controlling an electrical machine in a drivetrain of a motor vehicle, the electrical machine being used as a drive unit for the motor vehicle. According to the present invention, a pilot control unit determines a pilot control torque as a function of a predefined target torque of the electrical machine. The pilot control unit has a transfer function that corresponds to an oscillation component of a transfer function ascertained in model-supported fashion for the overall drivetrain. This overall transfer function describes a dependence of a rotation speed of the electrical machine on a torque with which the electrical machine is operated. A corrected target torque for the electrical machine is determined by superimposing the pilot control torque on the predefined target torque, and the electrical machine is controlled as a function of the corrected target torque.

The present invention also makes available a system for controlling an electrical machine in a drivetrain of a motor vehicle, the electrical machine being used as a drive unit for the motor vehicle. The system according to the present invention encompasses a pilot control unit that determines a pilot control torque as a function of a predefined target torque of the electrical machine. The pilot control unit has a transfer function that corresponds to an oscillation component of a transfer function ascertained in model-supported fashion for the overall drivetrain, which function describes a dependence of a rotation speed of the electrical machine on a torque with which the electrical machine is operated. The system according to the present invention furthermore encompasses a control unit for the electrical machine, which determines a corrected target torque for the electrical machine by superimposing the pilot control torque on the predefined target torque and controlling the electrical machine as a function of the corrected target torque.

The use of a torque pilot control system makes it possible to modulate the target torque for the electrical machine, said torque being predefined e.g. by a driver by way of a corresponding actuation of the accelerator pedal or by a higher-order control device, by superimposing a pilot control torque, in such a way that drivetrain oscillations are avoided or at least greatly reduced solely by way of the suitable profile over time of the corrected target torque generated in this fashion. The method and system according to the present invention have the advantage that no current state variables or operating variables from the motor vehicle are needed, along with the predefined target torque, in order to determine the pilot control torque. All that is necessary in order to define the transfer function of the pilot control unit is a physical model of the overall drivetrain, i.e. the electrical machine, wheels, a transmission, and if applicable further components of the drivetrain, which model reconstructs the oscillation capability of the mechanical structure of the overall system. This model can be defined in the context of vehicle manufacture, for example in the form of a single- or multiple-mass oscillator. From this the transfer function of the overall drivetrain, and therefrom ultimately the transfer function of the pilot control unit, can be ascertained using known mathematical methods. The pilot control unit can then be realized by way of a corresponding pilot control algorithm that is stored in a control unit, advantageously the control unit of the electrical machine.

According to the exemplary embodiments and/or exemplary methods of the present invention, the drivetrain of the motor vehicle is modeled as a two-mass oscillator, and the transfer function of the pilot control unit is defined as $$G = \frac{J_2 s^2}{(J_1 + J_2)s^2 + d(J_1 + J_2)s + c(J_1 + J_2)}$$

where
$J_1$ = moment of inertia of the electrical machine $J_2$=equivalent moment of inertia of the motor vehicle, including all vehicle resistance values
$c$=equivalent spring stiffness of the drivetrain
$d$=equivalent damping constant of the drivetrain.

A simple transfer function of this kind is often already sufficient to achieve satisfactory avoidance or reduction of rotation-speed oscillations of the electrical machine.

If a reduction in the rotation speed oscillations of the electrical machine achieved by pilot control according to the present invention is not sufficient, it is possible to use an observer that estimates an oscillation component based on measured rotation speed signals of the electrical machine, and superimposes a compensation torque on the predefined target torque. Provision is accordingly made, in a further embodiment of the present invention, that a current rotation speed of the electrical machine is ascertained with the aid of a rotation speed sensor suite; an oscillation component is estimated from the current rotation speed with the aid of an observer, based on a stored physical model of the drivetrain; on the basis of the estimated oscillation component, a compensation torque is determined by way of an evaluation unit; and the corrected target torque for the electrical machine is determined by superimposing the pilot control torque and the compensation torque on the predefined target torque. The observer and the evaluation unit can be realized by way of a corresponding respective estimation and evaluation algorithm that is stored in a control unit, advantageously the control unit of the electrical machine.

If the drivetrain has, between the electrical machine and a shaft that is to be driven, a transmission having an adjustable conversion ratio, the system behavior then changes as a function of the current transmission conversion ratio. The exemplary embodiments and/or exemplary methods of the present invention accordingly provides that the oscillation component can be estimated with the aid of multiple stored physical models of the drivetrain; and that the respective model used for estimation is selected as a function of the current transmission conversion ratio. The model, and thus the compensation torque based thereon, can in this fashion be better adapted to the respective system behavior, and more effective oscillation damping can thereby be achieved.

Alternatively or additionally, provision can also be made that multiple parameter sets are stored for a stored physical model that is used to estimate the oscillation component, and the respective parameter set used for estimation is selected as a function of the current transmission conversion ratio. In this way as well, the model, and thus the compensation torque based thereon, can be better adapted to the respective system behavior, and more effective oscillation damping can thereby be achieved.

Further features and advantages of embodiments of the exemplary embodiments and/or exemplary methods of the present invention are evident from the description below with reference to the attached Figures.

DETAILED DESCRIPTION

Figure 2:
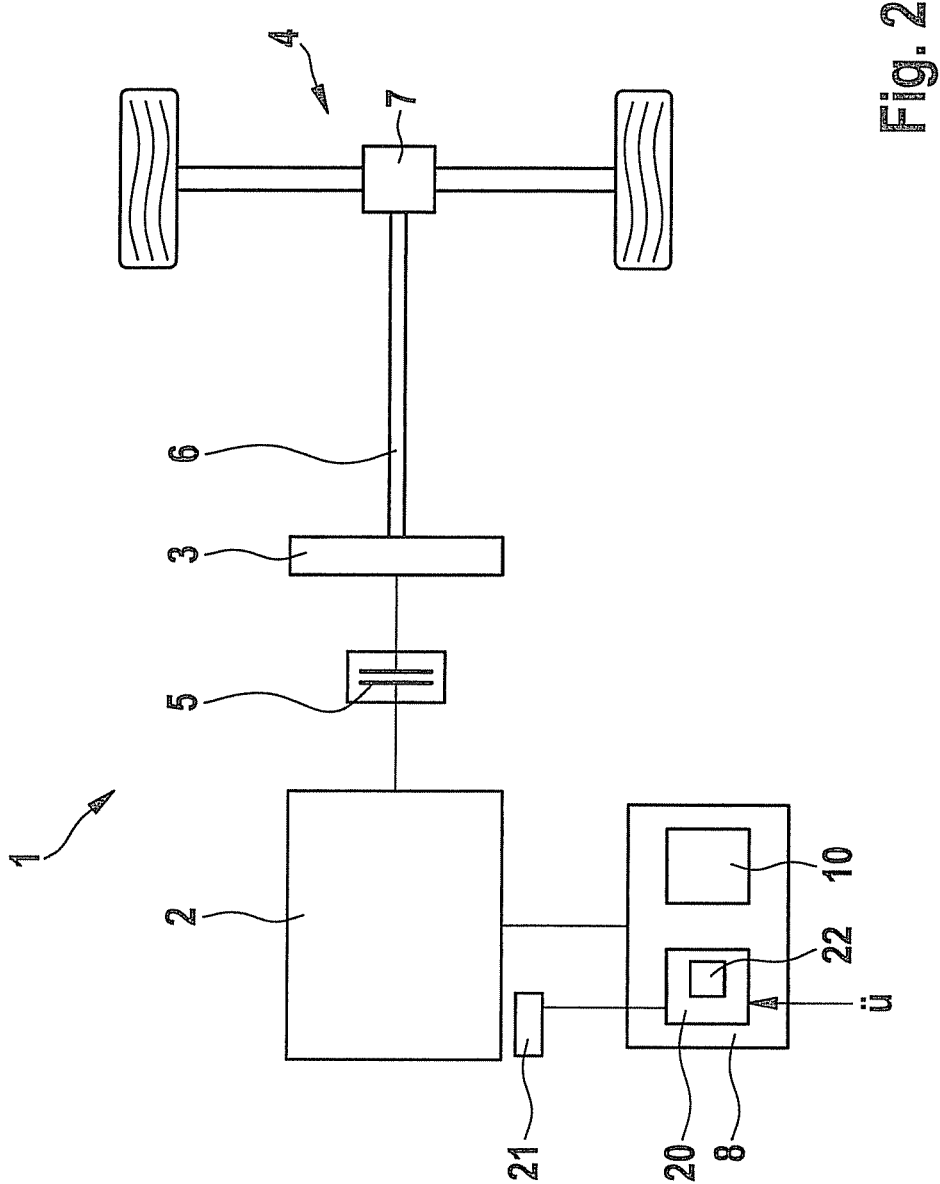
FIG. 2 schematically depicts a drivetrain of a motor vehicle.

FIG. 2 schematically shows one possible embodiment of a drivetrain 1 of a motor vehicle. Drivetrain 1 for the motor vehicle (not otherwise depicted) has an electrical machine 2, a transmission 3, and a drivable axle 4 connected to the transmission output shaft. The drivable axle can be selectably a front or rear axle of the motor vehicle. Disposed between electrical machine 2 and transmission 3 is a coupling 5 that in the closed state connects electrical machine 2 to transmission 3, and in the open state decouples from electrical machine 2 a portion of drivetrain 1 located on the power output side of the internal combustion engine. Transmission 3 can be embodied as an automatic or automated transmission, or also as a manually shifted transmission. A shaft 6 to be driven (output drive shaft), proceeding from transmission 3, leads directly from the transmission output side to an input side of an axle differential 7 that converts a rotary motion of output drive shaft 6 into a rotary motion that drives axle 4. A control unit 8 is provided in order to control electrical machine 2.

In the exemplifying embodiment depicted, the drivetrain is embodied as a "classic" drivetrain of an electric vehicle, which has the electrical machine as the only drive unit. Be it noted, however, that it is in principle immaterial with regard to the applicability of the exemplary embodiments and/or exemplary methods of the present invention whether the vehicle is an electric vehicle or a hybrid vehicle whose drivetrain encompasses, in addition to the electrical machine, a further drive unit, usually in the form of an internal combustion engine. The drivetrain can also encompass multiple electrical machines that are used as drive units. The point in a drivetrain at which an electrical machine is coupled is likewise immaterial in terms of the applicability of the exemplary embodiments and/or exemplary methods of the present invention, provided said machine is usable as a drive unit. For example, the electrical machine can also be connected to the axle differential directly, or indirectly via a transmission. Similarly, electrical machines could be coupled to wheel hubs directly, or indirectly via a transmission.

Figure 1:
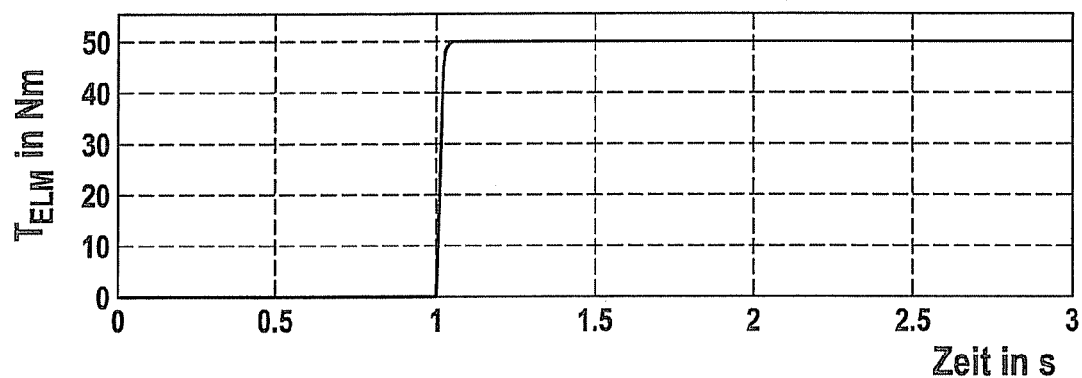
FIG. 1 shows a profile over time of a torque and of a rotation speed of an electrical machine in a drivetrain of a motor vehicle, without a pilot control system according to the present invention.
Figure 1:
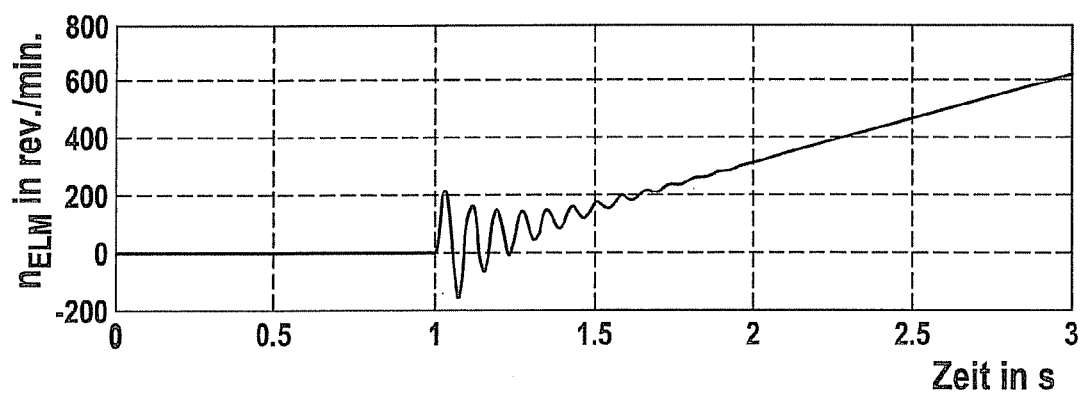
Figure 3:
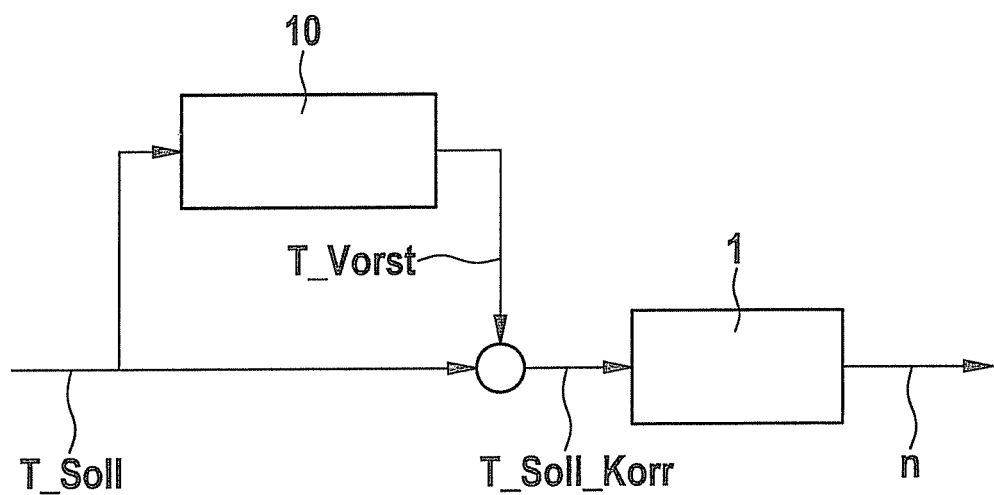
FIG. 3 schematically depicts a control system according to the present invention having a pilot control unit.

A basic property of drivetrain 1 of a motor vehicle is its ability to oscillate. This means that especially in a context of dynamic load changes, the rotation speed of electrical machine 2 can oscillate considerably despite an ideally smooth profile for the propulsion torque of electrical machine 2 (see FIG. 1). In order to avoid or at least considerably reduce such oscillations, a pilot control unit 10 (see also FIG. 3) is provided which, as a function of a predefined target torque T_Soll of electrical machine 2, which torque is predefined e.g. by an actuation of an accelerator pedal (not depicted) or by a higher-level control unit, determines a pilot control torque T_Vorst. The pilot control torque T_Vorst is then superimposed on the target torque T_Soll and in that fashion a corrected target torque T_Soll_Korr is formed, on the basis of which electrical machine 2 is then controlled by control unit 8.

In order to achieve in this context the desired avoidance or at least reduction of oscillations of the rotation speed n of electrical machine 2 that are produced by the ability of drivetrain 1 to oscillate, pilot control unit 10 has a transfer function that corresponds to an oscillation component of a transfer function ascertained in model-supported fashion for the overall drivetrain 1. This overall transfer function ascertained in model-supported fashion describes a dependence of a rotation speed of electrical machine 2 on a torque with which electrical machine 2 is operated. In order to ascertain this transfer function, the overall drivetrain 1 of the vehicle, including electrical machine 2, transmission 3, axle 4, coupling 5, wheels, and if applicable further components, is firstly described in the form of a physical equivalent model.

Figure 4:
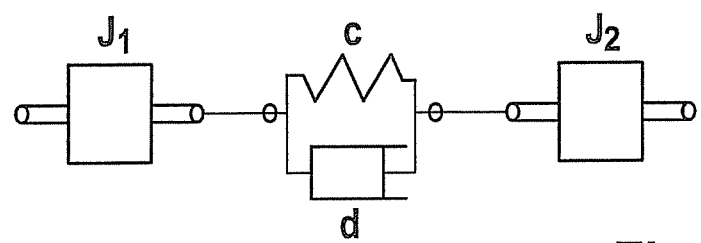
FIG. 4 shows a physical equivalent model of a drivetrain (two-mass oscillator).

FIG. 4 shows, by way of example, a physical model of drivetrain 1 as a two-mass oscillator. Depending on the specific configuration of drivetrain 1 or also in accordance with specific requirements, however, other equivalent models such as single- or multi-mass oscillators can also be used. The equivalent model in the form of the two-mass oscillator has the following parameters:

$J_1$ moment of inertia of the electrical machine
$J_2$ equivalent moment of inertia of the motor vehicle, including all vehicle resistance values
c equivalent spring stiffness of the drivetrain
d equivalent damping constant of the drivetrain
u system excitation (in this case: torque of the electrical machine)

For the two-mass oscillator depicted in FIG. 4, the following equations of motion are obtained in the time domain:

$$\dot{x}_1(t) = x_3(t) \quad (1)$$

$$\dot{x}_2(t) = x_4(t) \quad (2)$$

$$\dot{x}_3(t) = -\frac{c}{J_1} \cdot (x_1(t) - x_2(t)) - \frac{d}{J_1} \cdot (x_3(t) - x_4(t)) + \frac{1}{J_1} u(t) \quad (3)$$

$$\dot{x}_4(t) = -\frac{c}{J_2} \cdot (x_1(t) - x_2(t)) + \frac{d}{J_2} \cdot (x_3(t) - x_4(t)) \quad (4)$$

If the above equations (1) to (4) are converted, for example by Laplace transformation, into the frequency domain, and the rotation speed of the electrical machine is defined as an output variable y, the following transfer function G(s) is obtained for the overall drivetrain:

$$G(s) = \frac{y(s)}{u(s)} = \frac{J_2 s^2 + ds + c}{(J_1 + J_2)s^2 + d(J_1 + J_2)s + c(J_1 + J_2)} \quad (5)$$

This transfer function thus describes a dependence of a rotation speed of electrical machine 2 on a torque with which electrical machine 2 is operated. The oscillation component of transfer function G(s) of the overall drivetrain 1 can then be ascertained from equation (5) by taking into account only the nonlinear and non-constant components (summands in the numerator). This yields the oscillation component $g_{OSC}(s)$ of the overall transfer function G(S) as $$G_{OSC}(s) = \frac{y_{OSC}(s)}{u(s)} = \frac{J_2 s^2}{(J_1 + J_2)s^2 + d(J_1 + J_2)s + c(J_1 + J_2)} \quad (6)$$

If the transfer function $G_{Vorst}(s)$ of the pilot control unit is then set to be equal to the oscillation component $G_{OSC}(s)$ of the transfer function G(S), ascertained in model-based fashion, of the overall drivetrain 1, this results in a considerable reduction in rotation speed oscillations of electrical machine 2.

Figure 5:
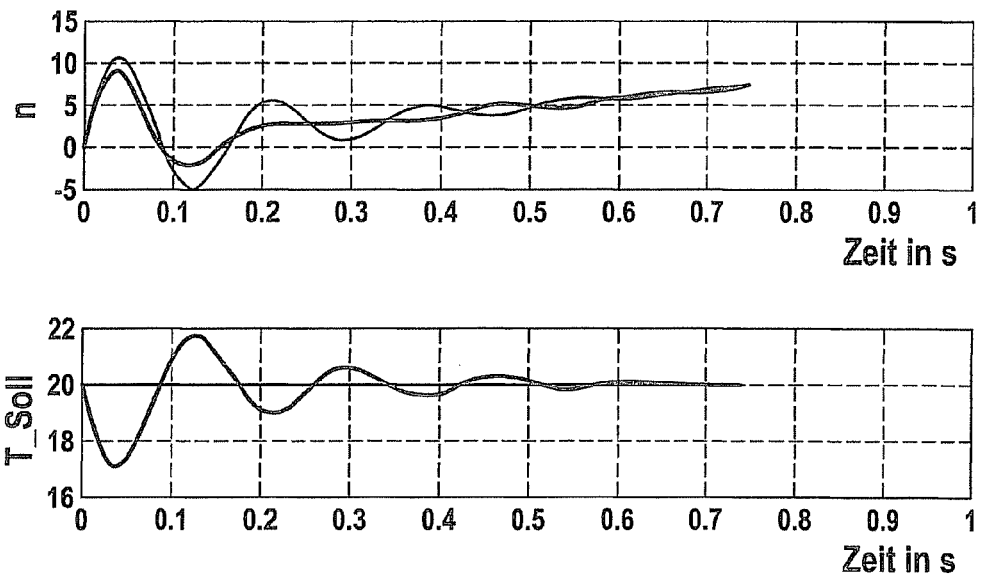
FIG. 5 shows a profile over time of a torque and of a rotation speed of an electrical machine in a drivetrain of a motor vehicle, respectively with and without pilot control according to the present invention.

FIG. 5 shows an exemplifying juxtaposition of the profile over time of a target torque (below) and a rotation speed resulting therefrom (above) of electrical machine 2 with the use of pilot control according to the present invention (thick lines) as compared with the corresponding profiles of the target torque and resulting rotation speed without pilot control (thin lines).

Figure 6:
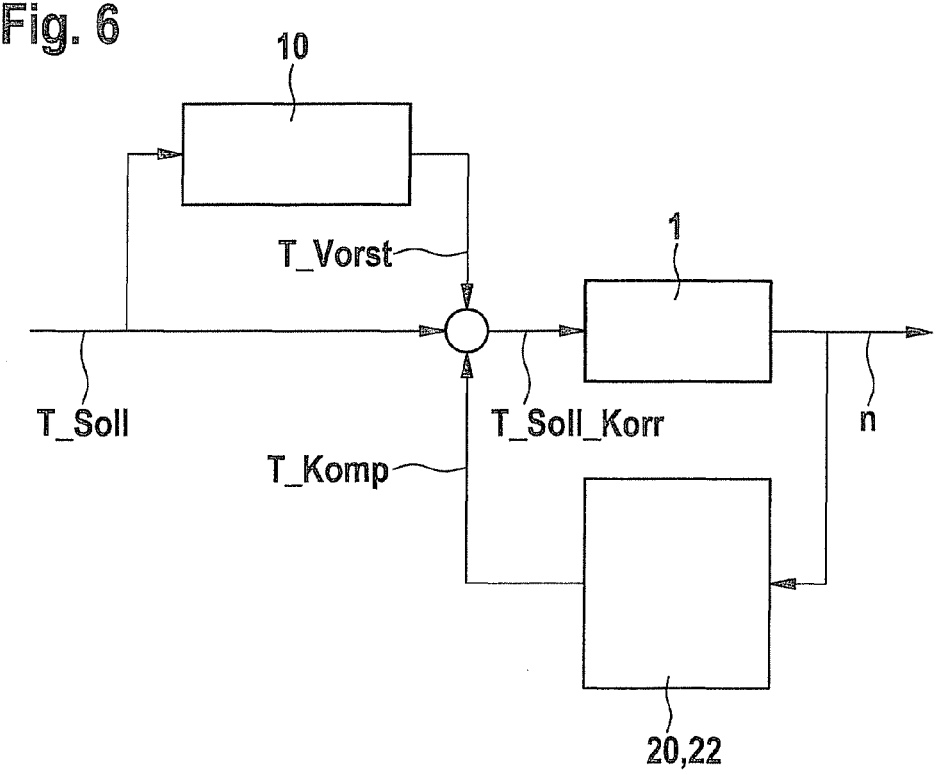
FIG. 6 schematically depicts a control system according to the present invention having a pilot control unit and observer.

In order to further reduce the rotation speed oscillations of electrical machine 2, it is possible to use an observer 20 (see FIG. 2) that estimates an oscillation component from measured rotation speed signals of electrical machine 2 based on a stored physical model of drivetrain 1. A current rotation speed n can be ascertained with the aid of a rotation speed sensor suite 21 (see FIG. 2). On the basis of the estimated oscillation component, a compensation torque T_Komp is then determined by an evaluation unit 22 and, like the pilot control torque T_Vorst, is likewise superimposed on the predetermined target torque T_Soll (see FIG. 6). Electrical machine 2 is then controlled on the basis of the corrected target torque T_Soll_Korr generated in this fashion.

In accordance with the embodiment depicted in FIG. 2, pilot control unit 10, observer 20, and evaluation unit 22, which can be realized e.g. in the form of corresponding algorithms, are an integral constituent of control unit 8 of electrical machine 2. These components can, however, also be realized at least partly as independent units, or integrated into another control unit of the motor vehicle.

If drivetrain 1 has, as depicted in FIG. 2, a transmission 3 having an adjustable conversion ratio between electrical machine 2 and a shaft 6 to be driven, the behavior of the overall system then also depends critically on a current transmission conversion ratio or gear ratio ü. In order to account for this fact, the oscillation component can also be capable of being estimated by observer 20 with the aid of multiple stored physical models of drivetrain 1, the respective model used for estimation being selected as a function of the current transmission conversion ratio ü. The transmission conversion ratio ü, or a variable characterizing the transmission conversion ratio, for example the gear ratio, can be delivered to observer 20 or to the control unit in which the observer is realized, for example via a CAN bus.

Alternatively or additionally, multiple parameter sets can be stored for a stored physical model that is used to estimate the oscillation component in observer 20. The respective parameter set used for estimation can then likewise be selected as a function of the current transmission conversion ratio ü. In this way as well, the model and thus the compensation torque based thereon can be better adapted to the respective system behavior, and more effective oscillation damping can thereby be achieved.

What is claimed is:

1. A method for controlling an electrical machine in a drivetrain of a motor vehicle, the electrical machine being used as a drive unit for the motor vehicle, the method comprising:

determining, with a pilot control unit, a pilot control torque as a function of a predefined target torque of the electrical machine, the pilot control unit having a transfer function that corresponds to an oscillation component of a transfer function, ascertained in model-supported fashion for the overall drivetrain, that describes a dependence of a rotation speed of the electrical machine on a torque with which the electrical machine is operated as a function of (i) a moment of inertia of the electrical machine in the drivetrain of the motor vehicle and (ii) a moment of inertia of the motor vehicle;

determining a corrected target torque for the electrical machine by superimposing the pilot control torque on the predefined target torque; and controlling the electrical machine as a function of the corrected target torque.

2. The method of claim 1, in which the drivetrain is modeled as one of a single-mass oscillator and a multiple-mass oscillator, which includes a two-mass oscillator, and the transfer function of the overall drivetrain is ascertained therefrom.

3. The method of claim 2, in which the drivetrain is modeled as a two-mass oscillator, and the transfer function of the pilot control unit (10) is defined as $$G = \frac{J_2 s^2}{(J_1 + J_2)s^2 + d(J_1 + J_2)s + c(J_1 + J_2)}$$

where
$J_1$=moment of inertia of the electrical machine,
$J_2$=equivalent moment of inertia of the motor vehicle, including all vehicle resistance values,
c=equivalent spring stiffness of the drivetrain, and
d=equivalent damping constant of the drivetrain.

4. The method of claim 1, wherein:
a current rotation speed of the electrical machine is ascertained,
an oscillation component is estimated from the current rotation speed with the aid of an observer, based on a stored physical model of the drivetrain,
on the basis of the estimated oscillation component, a compensation torque is determined, and
the corrected target torque for the electrical machine is determined by superimposing the pilot control torque and the compensation torque on the predefined target torque.

5. The method of claim 4, wherein:
the drivetrain has, between the electrical machine and a shaft that is to be driven, a transmission having an adjustable conversion ratio,
the oscillation component can be estimated with the aid of multiple stored physical models of the drivetrain, and
the respective model used for estimation is selected as a function of a current transmission conversion ratio.

6. The method of claim 4, wherein:
the drivetrain has, between the electrical machine and a shaft that is to be driven, a transmission having an adjustable conversion ratio,
multiple parameter sets are stored for a stored physical model that is used to estimate the oscillation component, and
the respective parameter set used for estimation is selected as a function of a current transmission conversion ratio.

7. A system for controlling an electrical machine in a drivetrain of a motor vehicle, the electrical machine being used as a drive unit for the motor vehicle, comprising:
a pilot control unit to determine a pilot control torque as a function of a predefined target torque of the electrical machine, the pilot control unit having a transfer function that corresponds to an oscillation component of a transfer function, ascertained in model-supported fashion for the overall drivetrain, that describes a dependence of a rotation speed of the electrical machine on a torque with which the electrical machine is operated as a function of (i) a moment of inertia of the electrical machine in the drivetrain of the motor vehicle and (ii) a moment of inertia of the motor vehicle; and
a control unit for the electrical machine to determine a corrected target torque for the electrical machine by superimposing the pilot control torque on the predefined target torque and controlling the electrical machine as a function of the corrected target torque.

8. The system of claim 7, further comprising:
a rotation speed sensor suite that ascertains a current rotation speed of the electrical machine;
an observer that estimates an oscillation component from the current rotation speed based on a stored physical model of the drivetrain; and
an evaluation unit that determines a compensation torque based on the estimated oscillation component, in which the control unit determines the corrected target torque for the electrical machine by superimposing the pilot control torque and the compensation torque on the predefined target torque.

9. The method of claim 1, wherein the moment of inertia of the motor vehicle includes all vehicle resistance values.

* * * * *